United States Patent
Abdulkawi et al.

(10) Patent No.: US 10,211,498 B1
(45) Date of Patent: Feb. 19, 2019

(54) RECONFIGURABLE RESONATORS FOR CHIPLESS RFID APPLICATIONS

(71) Applicant: KING SAUD UNIVERSITY, Riyadh (SA)

(72) Inventors: Wazie Mohammed Ahmed Abdulkawi, Riyadh (SA); Abdel Fattah Ahmed Sheta, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 15/974,588

(22) Filed: May 8, 2018

(51) Int. Cl.
  *G06K 19/077* (2006.01)
  *H01P 1/203* (2006.01)
  *G06K 7/10* (2006.01)
  *H01P 7/08* (2006.01)
  *G01S 13/75* (2006.01)

(52) U.S. Cl.
  CPC ........ *H01P 1/20363* (2013.01); *G01S 13/753* (2013.01); *G06K 7/10356* (2013.01); *G06K 19/0775* (2013.01); *G06K 19/07773* (2013.01); *H01P 7/082* (2013.01)

(58) Field of Classification Search
  CPC .. H01P 1/203; H01P 1/20336; H01P 1/20372; H01P 1/20381; H01P 1/205; H01P 7/082; G06K 19/07773
  USPC .................. 333/204, 205; 340/572.1, 572.7; 343/700 MS
  See application file for complete search history.

(56) References Cited

U.S. PATENT DOCUMENTS

2010/0194645 A1* 8/2010 Steffen ............... B41J 2/1753
  343/700 MS
2015/0302231 A1 10/2015 Makimoto et al.
2015/0310327 A1 10/2015 Karmakar et al.
(Continued)

FOREIGN PATENT DOCUMENTS

| CN | 106486739 | 3/2017 |
| FR | 2992758 A1 | 1/2014 |
| KR | 101119769 B1 | 3/2012 |

(Continued)

OTHER PUBLICATIONS

Preradovic et al., "Multiresonator-based Chipless RFID System for Low-Cost Item Tracking", IEEE Transactions on Microwave Theory and Techniques, 57(5), pp. 1411-1419 (2009).
(Continued)

*Primary Examiner* — Stephen E. Jones
(74) *Attorney, Agent, or Firm* — Richard C. Litman

(57) ABSTRACT

The reconfigurable resonators for chipless RFID applications provide spiral resonators for a multiple resonator passive RFID transponder tag. Each spiral resonator includes a U-shaped frame of conductive material and has a plurality (K−1) of parallel adjusting or shorting elements disposed between the legs of the U-shaped frame. Each resonator has one leg coupled to a transmission line adapted for connection between a receiving antenna and a transmitting antenna (in some embodiments, a single antenna may be used for both receiving and transmitting), and one of the adjusting or shorting elements may be selectively connected to the opposing leg of the frame to configure the resonator to resonate at one of (K−1) different resonant frequencies (K frequencies if none of the elements are connected) by a short metal jumper strip to change the length of the spiral resonator.

11 Claims, 7 Drawing Sheets

(56) References Cited

U.S. PATENT DOCUMENTS

2017/0140258 A1   5/2017   Gibson et al.
2017/0178059 A1   6/2017   Gibson et al.

FOREIGN PATENT DOCUMENTS

KR      101419840 B1    7/2014
WO    2009126999 A1   10/2009
WO    2013096995 A1    7/2013

OTHER PUBLICATIONS

Preradovoc et al., "Fully Printable Chipless RFID Tag", Advanced Radio Frequency Identification Design and Applications, Preradovic (Ed.), pp. 131-154 (2011).
Shao et al., "Directly Printed Packaging-Paper-Based Chipless RFID Tag With Coplanar Resonator", IEEE Antennas and Wireless Propagation Letters, 12, pp. 325-328 (2013)(Abstract only).
Laila et al., "A Novel Polarization Independent Chipless RFID Tag Using Multiple Resonators", Progress in Electromagnetics Research Letters, vol. 55, 61-66 (2015).
Veysi et al., "RFID ag Design Using Spiral Resonators and Defected Ground Structure", Radio Engineering, vol. 26, No. 4, pp. 1019-1024 (2017).

\* cited by examiner

US 10,211,498 B1

RECONFIGURABLE RESONATORS FOR CHIPLESS RFID APPLICATIONS

BACKGROUND

1. Field

The disclosure of the present patent application relates to passive, resonator-type RFID devices, and particularly to reconfigurable resonators for chipless RFID applications that function without a power storage and without an integrated circuit (IC) chip.

2. Description of the Related Art

Researchers are focusing on developing low cost chipless radio frequency identification (RFID) systems. Chipless RFID tag technology has been recently proposed as a promising way to reduce the tag cost. The cost reduction is mainly achieved by eliminating the need of an IC chip, and thus producing fully printable tag structures. The tag cost, in this case, depends on the substrate material, the material size, the technology, and the amount of conductive material used.

RFID technologies have been developed in recent years to overcome barcode limitations, such as low storage capacity, the need for a line-of-sight, small range, and an inability to reprogram. A common type of RFID tag uses an integrated circuit (IC) chip. However, this limits the use of RFID tags in many applications due to high tag cost compared to item cost. Chipless RFID tag technology provides a technique for reducing the tag's cost by eliminating the need for an IC chip, and thus producing fully printable tag structures. Chipless RFID tags are sorted into two categories: (1) Radar Cross Section (RCS) tags, and (2) retransmission tags.

However, chipless RFID tags are currently not in use for such applications as inventory control for low cost products primarily because of the need for an economical way of encoding more information on a small, passive tag that can be applied to products or packaging, e.g., by printing with conductive ink. Thus, reconfigurable resonators for chipless RFID applications solving the aforementioned problems is desired.

SUMMARY

The reconfigurable resonators for chipless RFID applications provide spiral resonators for a multiple resonator passive RFID transponder tag. Each spiral resonator includes a U-shaped frame of conductive material and has a plurality (K−1) of parallel, equally spaced adjusting or shorting elements disposed between the legs of the U-shaped frame. Each resonator has one leg coupled to a transmission line adapted for connection between a receiving antenna and a transmitting antenna (in some embodiments, a single antenna may be used for both receiving and transmitting), and one of the adjusting or shorting elements may be selectively connected to the opposing leg of the frame to configure the resonator to resonate at one of (K−1) different resonant frequencies (K frequencies if none of the elements are connected) by a short metal jumper strip to change the length of the spiral resonator.

When an RFID reader broadcasts an interrogation signal, it is received by the receiving antenna and modulated at the transmission line by coupling to the resonators at different frequencies (referred to as a spectral signature), and then reflected back to the RFID reader through the transmitting antenna. Each resonator is designed to operate within a different range of frequencies. Each resonator may encode bits of information, the number of bits depending on the number of states, K. If there are K−1 adjusting or shorting elements and N resonators, then there are $K^N$ possible codes for encoding the tag. Thus, a single resonator circuit can be used for multiple applications by configuring the K−1 adjusting or shorting elements of the N resonators, which is more economical than current chipless RFID tag designs.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
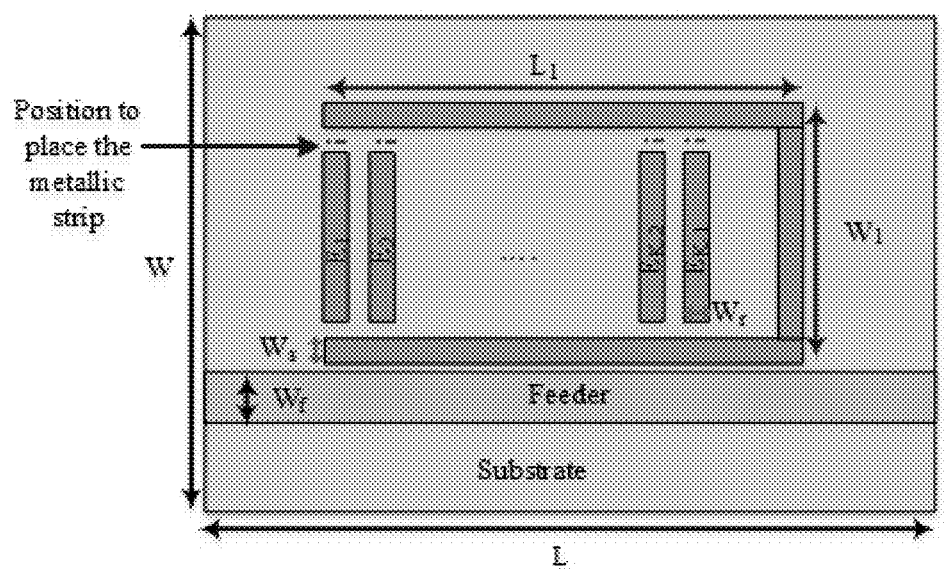
FIG. 1 is a schematic diagram of a single resonator of the reconfigurable resonators for chipless RFID applications having K−1 adjusting or shorting elements.

The reconfigurable resonators for chipless RFID applications provide spiral resonators for a multiple resonator passive RFID transponder tag. Each spiral resonator includes a U-shaped frame of conductive material and has a plurality (K−1) of parallel adjusting or shorting elements disposed between the legs of the U-shaped frame. Each resonator has one leg coupled to a transmission line adapted for connection between a receiving antenna and a transmitting antenna (in some embodiments, a single antenna may be used for both receiving and transmitting), and one of the adjusting or shorting elements may be selectively connected to the opposing leg of the frame to configure the resonator to resonate at one of (K−1) different resonant frequencies (K frequencies if none of the elements are connected) by a short metal jumper strip to change the length of the spiral resonator.

When an RFID reader broadcasts an interrogation signal, it is received by the receiving antenna and modulated at the transmission line by coupling to the resonators at different frequencies (referred to as a spectral signature), and then reflected back to the RFID reader through the transmitting antenna. The spiral resonators act as stopband (or bandstop) filters, attenuating the amplitude and causing jumps in the phase of backscatter or scattering parameters of the interrogation signal at the resonant frequency of the resonator. Such attenuation and/or phase jumps may be easily detected in the reflected signal transmitted by the RFID tag reader. Thus, amplitude attenuation or phase ripple may be interpreted as a logic "0" by the reader at the resonant frequency, while its absence may be interpreted as a logic "1". Each resonator is designed to operate within a different range of frequencies. Each resonator may encode bits of information, the number of bits depending on the number of states, K. If there are K−1 adjusting or shorting elements and N resonators, then there are $K^N$ possible codes for encoding the tag. Thus, a single resonator circuit can be used for multiple applications by configuring the K−1 adjusting or shorting elements of the N resonators, which is more economical than current chipless RFID tag designs.

The present resonator circuit may provide for a compact chipless radio frequency identification (RFID) tag when coupled to a receiving antenna and a transmitting antenna (in some embodiments, a single antenna may be used for both receiving and transmitting). The resonator circuit comprises N resonators, and each resonator has (K−1) arms (adjusting or shorting elements). For each resonator, K resonance frequencies are possible. Therefore, the tag can be reconfigured for $K^N$ codes and K×N possible frequencies. The RFID reader for the chipless tags needs to read only N frequencies for each code.

The reference to "spiral" means that the resonator curls around in a generally spiral pattern, although the present resonators include only the outer loop of the spiral. The present resonators have a spiral formed from straight segments. However, straight or curved segments can be used. The resonator has a plurality of conductive adjusting or shorting elements positioned within a U-shaped frame, and connection of the adjusting or shorting elements with the frame completes the spiral. In the case of a resonator with K resonance frequencies, (K−1) elements are positioned in order to provide K states.

The description "conductive" refers to the conductivity at a radio frequency at which resonance is desired. In a non-limiting example, this is the same as electric conductivity, although it is contemplated that the structure of the resonator may be such that conductivity is assured at the desired resonant frequency, but not necessarily at all frequencies or as DC conductivity. Therefore, while a "metallic strip" and "metal elements" may be described in the examples, the use of a "metallic" material is given by way of non-limiting example, and any suitable conductive material can be used. It is possible to make the strip out of any suitable radioconductive material.

FIG. 1 is a schematic diagram showing a single resonator modelled as microstrip on a dielectric substrate, e.g., copper strips etched on PC board. It will be understood, however, that in practice, the RFID tag may be realized, e.g., as conductive ink printed on a non-conductive substrate. The exemplary resonator shown in FIG. 1 has a variable number of adjusting or shorting elements, designated as $E_1$ through $E_{K-1}$, parallel to each other between the legs of a U-shaped spiral resonator frame. A transmission line, designated by the label "Feeder", extends parallel to one leg of the U-shaped spiral resonator frame and spaced closely to the leg of the frame so that a signal propagated from one end of the feeder line to the other is coupled to the resonator. In practice, the chipless RFID tag is completed by connecting opposite ends of the transmission or feeder line to an antenna (e.g., a wideband or ultrawideband patch antenna) for receiving an interrogation signal from, and re-transmitting the interrogation after coupling to the resonator to, the RFID reader, similar to the chipless RFID tag shown in FIG. 2(a) of International Patent No. WO 2009/126999, which is hereby incorporated by reference in its entirety. In FIG. 1, an arrow pointing to the gap between the adjusting or shorting elements and the opposite leg of the U-shaped spiral resonator frame shows where a metal strip or other conductive jumper may be placed to connect one of the K−1 adjusting or shorting elements to the opposite leg of the U-shaped spiral resonator frame, thereby adjusting the length of the spiral and corresponding resonant frequency of the resonator. Thus, the resonator has higher bit encoding capacity and smaller tag size than previous designs of multiresonator chipless RFID tags. One resonator can be adjusted to resonate at one specific resonance frequency out of K possible frequencies. A tag having N such resonators provides K×N possible frequencies, with N resonant frequencies for the complete symbol or code on the tag, each resonator encoding bits of information. Therefore, the tag can be reconfigured for $K^N$ codes, while, the RFID reader needs to read only N-frequency ranges. This process increases dramatically the number of possible codes with respect to the number of resonators, while also simplifying the reading process.

For example, if N=4 and K=10, the disclosed structure provides 10000 codes. By contrast, a conventional bi-state resonator structure provides 16 codes for 4 resonators.

Figure 2:
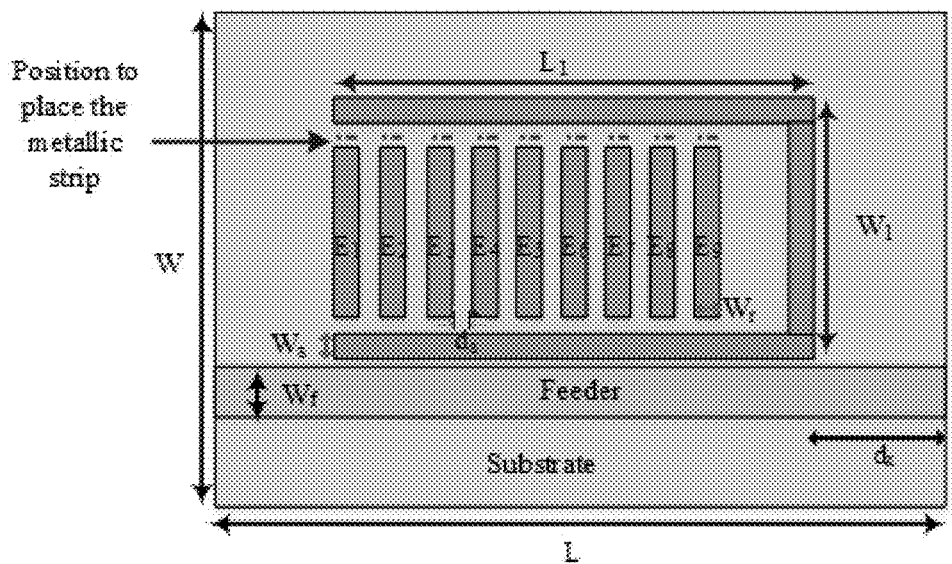
FIG. 2 is a schematic diagram of a single resonator of the reconfigurable resonators for chipless RFID applications having nine adjusting or shorting elements ($E_1$ through $E_9$).

FIG. 2 is a schematic diagram showing an exemplary resonator having nine arms or elements, ($E_1$ to $E_9$, that is, K−1=9) and a coupled transmission line placed very close to the resonator is studied as a proof of concept. The feeder (transmission line) is positioned sufficiently close to the resonator frame that the feeder is coupled with the resonator frame at the K resonant frequencies. In the case of multiple resonators (N resonators), the feeder is positioned sufficiently close to each of the resonator frames to couple the transmission line with the resonator frame at the K×N resonant frequencies. The feeder receives and transmits through at least one antenna.

Any of these elements, $E_1$ to $E_9$ or arms, can be connected to the coupled line by a small metallic strip or other conductive jumper. One element of these arms, $E_1$ to $E_9$, connected to the coupled line produces a resonant frequency selected from $f_1$ to $f_9$, respectively. If none of the elements is connected, the resonator resonates at frequency $f_{10}$, which could be considered to be a "base frequency" for that resonator. The tag has a plurality of resonators, each of the resonators being configured for a distinct frequency range, thereby allowing ordered detection of the resonation frequencies of each resonator.

Table 1 shows the dimensions of the exemplary resonator of FIG. 2, designed on an RT Duroid 5880 substrate with dielectric constant 2.2, loss tangent of 0.0009, and thickness of 0.79 mm. These dimensions are optimized to resonate at any of the 10 resonant frequencies, from $f_1$ to $f_{10}$, shown in Table 2.

TABLE 1

Dimensions of exemplary resonator

| Parameter | Parameter description | Physical value (mm) |
|---|---|---|
| L | Length of the disclosed tag | 28.5 |
| W | Width of the disclosed tag | 15.35 |
| $L_l$ | Length of the spiral resonator | 18.5 |
| $W_l$ | Width of the spiral resonator | 7.7 |
| $W_r$ | Width of each element | 1.05 |
| Ws | Width of the coupled line | 1 |
| $W_f$ | Feeder width | 2.45 |
| Gap | Gap between resonator and microstrip feed line | 0.2 |
| $d_x$ | Separation between spiral resonator and port | 5 |
| $d_s$ | Separation between two arms of the resonator | 0.7 |

TABLE 2

Possible resonant frequencies

| Element connected to frame | Identifier | Frequency |
|---|---|---|
| $E_1$ | $f_1$ | 2.356 |
| $E_2$ | $f_2$ | 2.371 |
| $E_3$ | $f_3$ | 2.393 |
| $E_4$ | $f_4$ | 2.421 |
| $E_5$ | $f_5$ | 2.452 |
| $E_6$ | $f_6$ | 2.489 |
| $E_7$ | $f_7$ | 2.526 |
| $E_8$ | $f_8$ | 2.563 |
| $E_9$ | $f_9$ | 2.604 |
| None | $f_{10}$ | 2.663 |

Figure 3A:
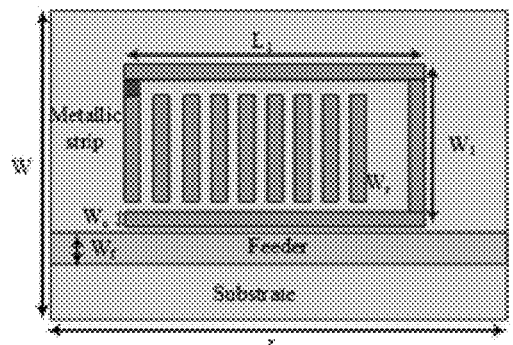
FIGS. 3A, 3B, 3C, 3D, 3E, 3F, 3G, 3H, and 3I are schematic diagrams of the resonator of FIG. 2, successively showing adjusting or shorting elements $E_1$ through $E_9$ connected to the spiral frame by a short metal jumper, and with no connection to the spiral frame in FIG. 3J, for ten configurations for a single resonator.
Figure 3B:
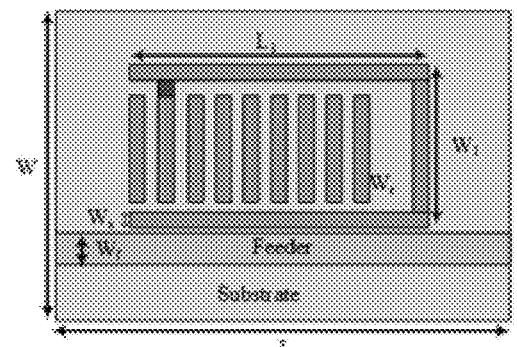
Figure 3C:
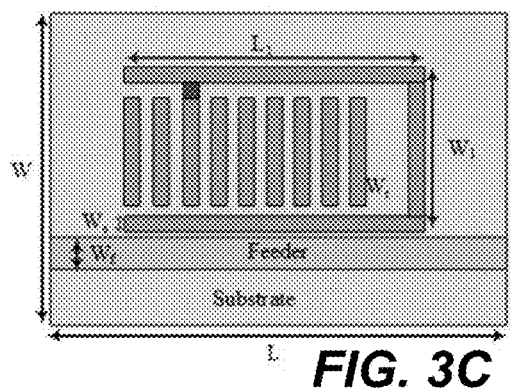
Figure 3D:
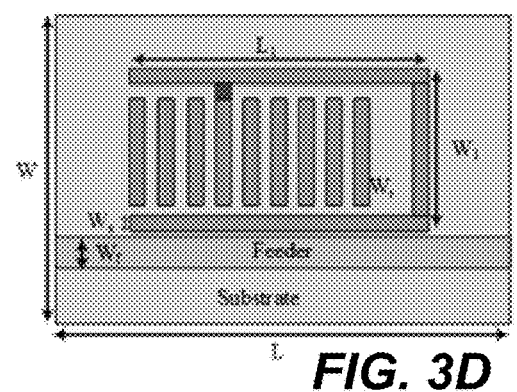
Figure 3E:
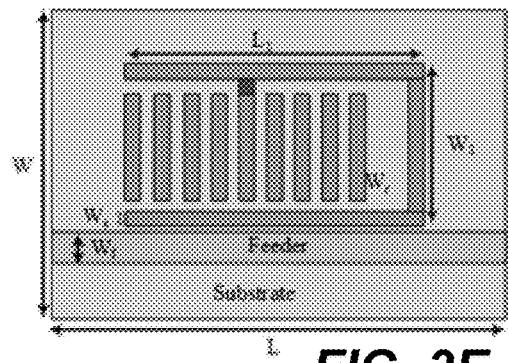
Figure 3F:
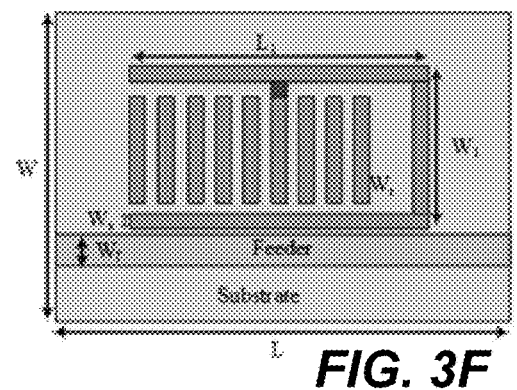
Figure 3G:
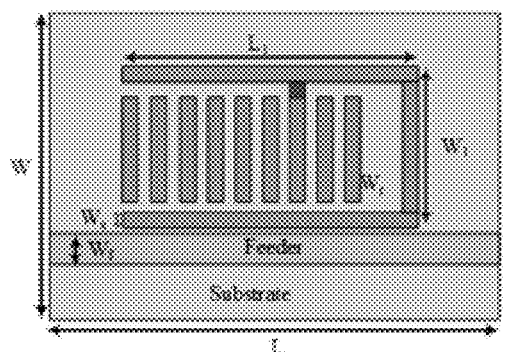
Figure 3H:
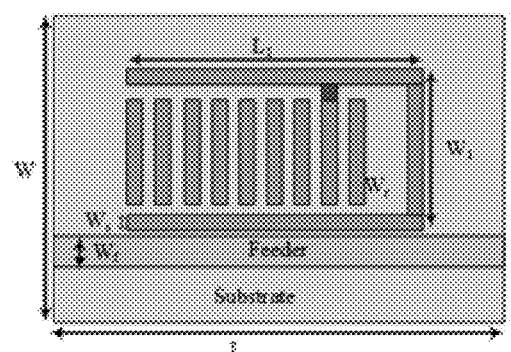
Figure 3I:
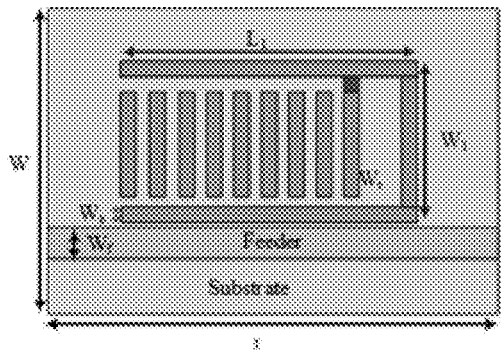
Figure 3J:
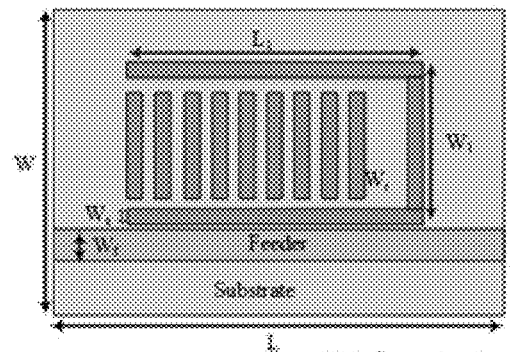

FIGS. 3A-3I are schematic diagrams of the resonator of FIG. 2, shown with a jumper connecting the adjusting or shorting elements $E_1$ through $E_9$ successively connected to the spiral resonator frame, respectively, to adjust the resonant frequency. FIG. 3J shows the resonator of FIG. 2 with none of the adjusting or shorting elements $E_1$ through $E_9$ connected to the spiral resonator frame, thereby producing a tenth resonant frequency. The arm connected to the coupled line is said to be active, and passive if it is kept unconnected. The resulting resonant frequencies are shown in Table 2.

Figure 4:
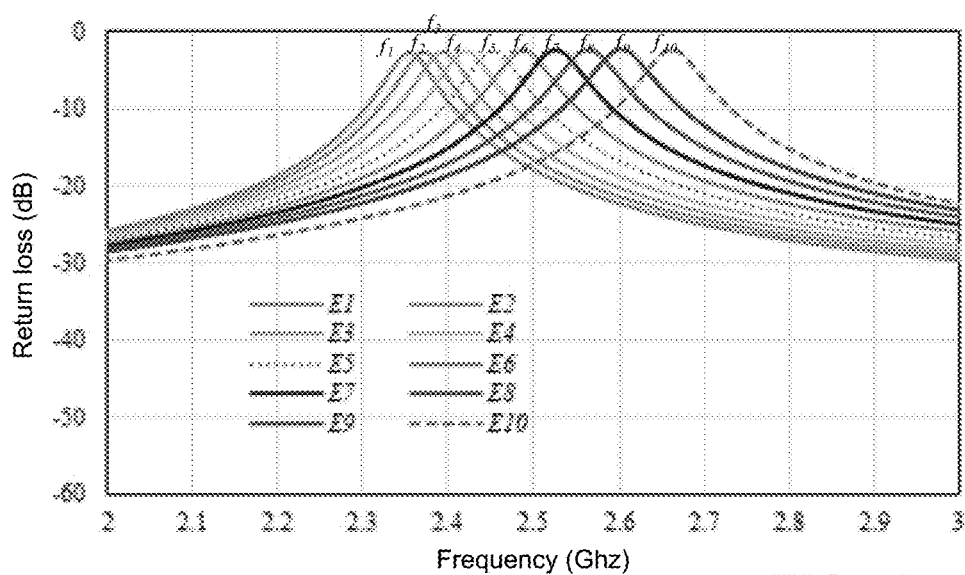
FIG. 4 is a composite plot of the simulated "$S_{11}$" scatter parameter (return loss) response patterns for the resonator states implemented by the resonator states depicted in FIGS. 3A-3J, the simulations being performed using an electromagnetic simulator.
Figure 5:
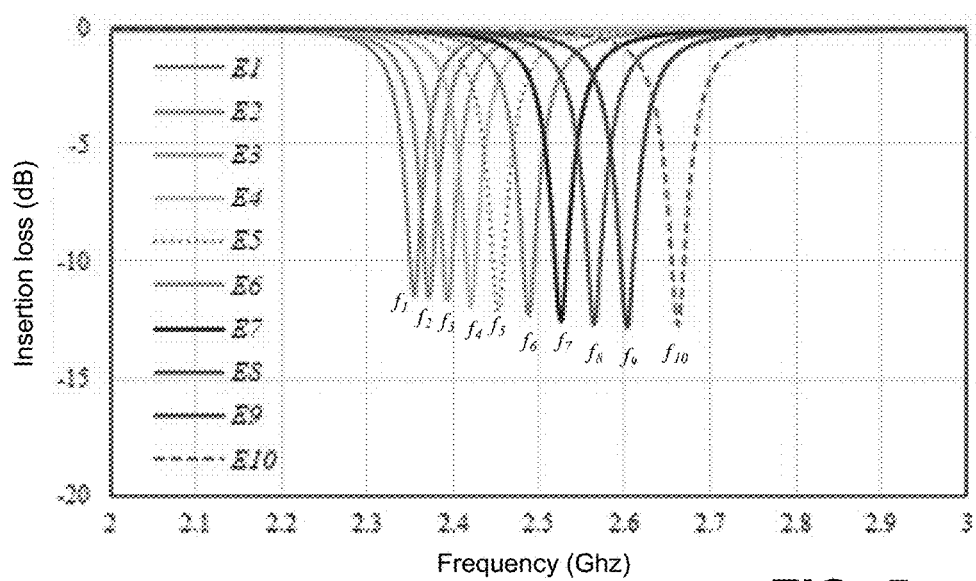
FIG. 5 is a composite plot of the simulated "$S_{21}$" scatter parameter (insertion loss) response patterns for the resonator states implemented by the resonator states depicted in FIGS. 3A-3J.

Simulations were performed using an electromagnetic simulator. FIG. 4 shows the simulated return loss ($S_{11}$) for the resonator states implemented by the resonator configurations of FIGS. 3A-3J. FIG. 5 shows the simulated insertion loss ($S_{21}$) for the resonator states implemented by the resonator configurations of FIGS. 3A-3J. From these simulated results, there are ten distinct resonant nulls in the magnitude.

Figure 6:
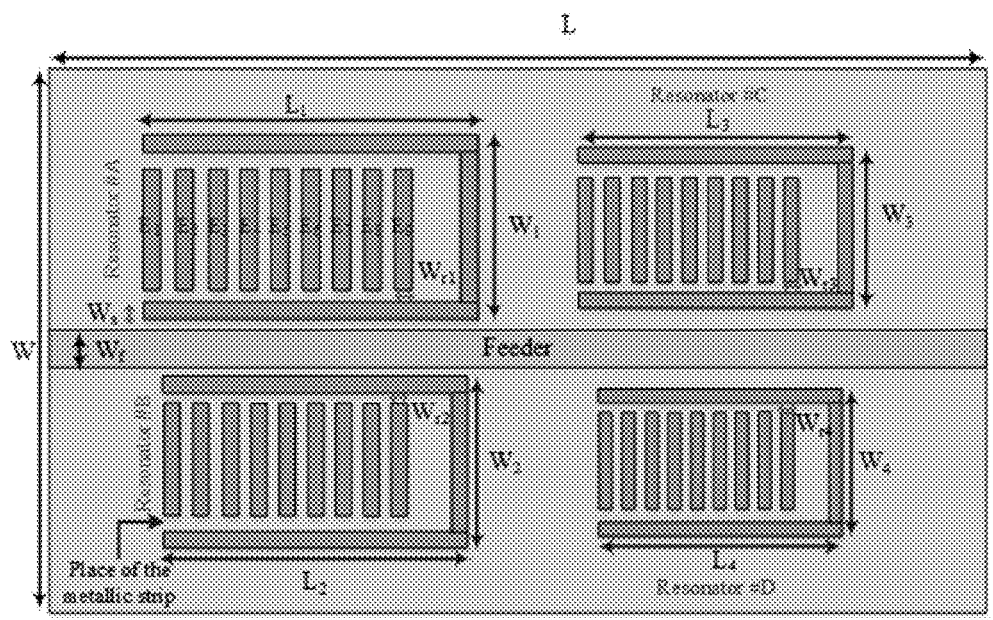
FIG. 6 is a schematic diagram of an embodiment of the reconfigurable resonators for chipless RFID applications having four resonators, each of the resonators having nine adjusting or shorting elements ($E_1$ through $E_9$).

FIG. 6 shows a resonator circuit having four resonators, designated resonator #A, resonator #B, resonator #C, and resonator #D in the drawing. Each of the resonators has nine adjusting or shorting elements selectively connected to the corresponding U-shaped spiral resonator frame, so that each resonator may be alternately set for one of ten resonant frequencies (K=10). Each of the resonators is also configured for coupling in a different and distinct frequency range (N=4) by the length and width of the segments of the spiral, the spacing between the segments, separation of the spiral from the transmission (Feeder) line, etc., which may be determined by reference to standard equations well known to those of ordinary skill in the art.

A prototype of the resonator circuit was designed on RT Duroid 5880 substrate with dielectric constant 2.2, loss tangent of 0.0009, and thickness of 0.79 mm. This resonator circuit comprised N resonators and each resonator has (K−1) arms. For each resonator, K-resonance frequencies are possible, therefore; so that the tag can be reconfigured for $K^N$ codes and K×N possible frequencies. The chipless RFID reader needs to read only N frequency bands, which are read simultaneously, for each code. Table 3 shows the forty possible frequencies for the prototype of the resonator circuit shown in FIG. 6.

TABLE 3

Table of frequencies (GHz) for prototype of four resonator embodiment

A

| $f_1$ | $f_2$ | $f_3$ | $f_4$ | $f_5$ | $f_6$ | $f_7$ | $f_8$ | $f_9$ | $f_{10}$ |
|---|---|---|---|---|---|---|---|---|---|
| 2.356 | 2.371 | 2.393 | 2.421 | 2.452 | 2.489 | 2.526 | 2.563 | 2.604 | 2.663 |

B

| $f_{11}$ | $f_{12}$ | $f_{13}$ | $f_{14}$ | $f_{15}$ | $f_{16}$ | $f_{17}$ | $f_{18}$ | $f_{19}$ | $f_{20}$ |
|---|---|---|---|---|---|---|---|---|---|
| 2.756 | 2.771 | 2.796 | 2.824 | 2.855 | 2.892 | 2.932 | 2.973 | 3.013 | 3.081 |

C

| $f_{21}$ | $f_{22}$ | $f_{23}$ | $f_{24}$ | $f_{25}$ | $f_{26}$ | $f_{27}$ | $f_{28}$ | $f_{29}$ | $f_{30}$ |
|---|---|---|---|---|---|---|---|---|---|
| 3.224 | 3.242 | 3.264 | 3.292 | 3.326 | 3.363 | 3.404 | 3.444 | 3.484 | 3.559 |

D

| $f_{31}$ | $f_{32}$ | $f_{33}$ | $f_{34}$ | $f_{35}$ | $f_{36}$ | $f_{37}$ | $f_{38}$ | $f_{39}$ | $f_{40}$ |
|---|---|---|---|---|---|---|---|---|---|
| 3.673 | 3.695 | 3.717 | 3.745 | 3.776 | 3.813 | 3.853 | 3.893 | 3.934 | 4.005 |

Figure 7:
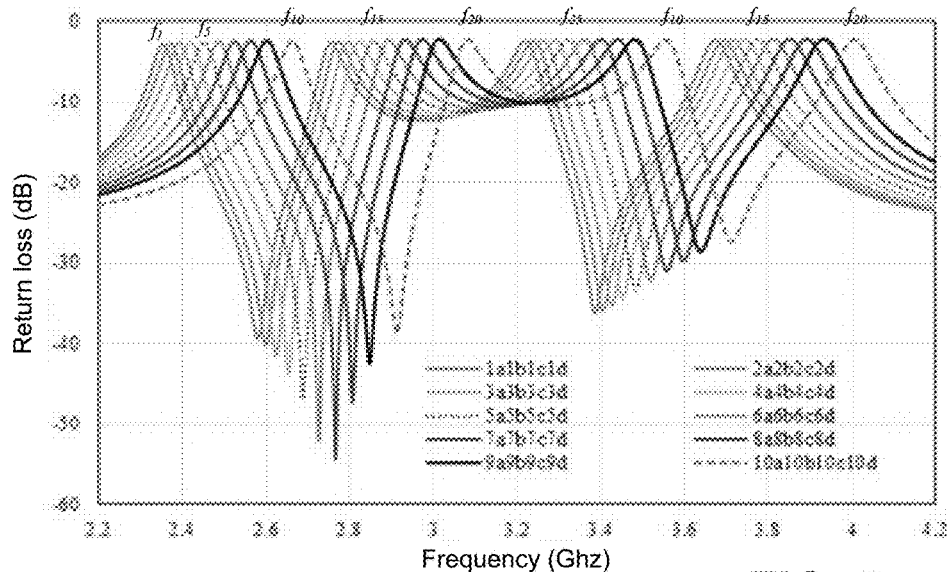
FIG. 7 is a composite plot of the simulated "$S_{11}$" scatter parameter (return loss) response patterns for the resonator circuit of FIG. 6, the ten traces resulting from connecting adjusting or shorting element $E_1$ to the spiral frame in each of all four resonators, then connecting adjusting or shorting element $E_2$ to the spiral frame in each of all four resonators, etc. through adjusting or shorting element $E_9$, and then with no adjusting or shorting element connected to the spiral frame in any of the four resonators.
Figure 8:
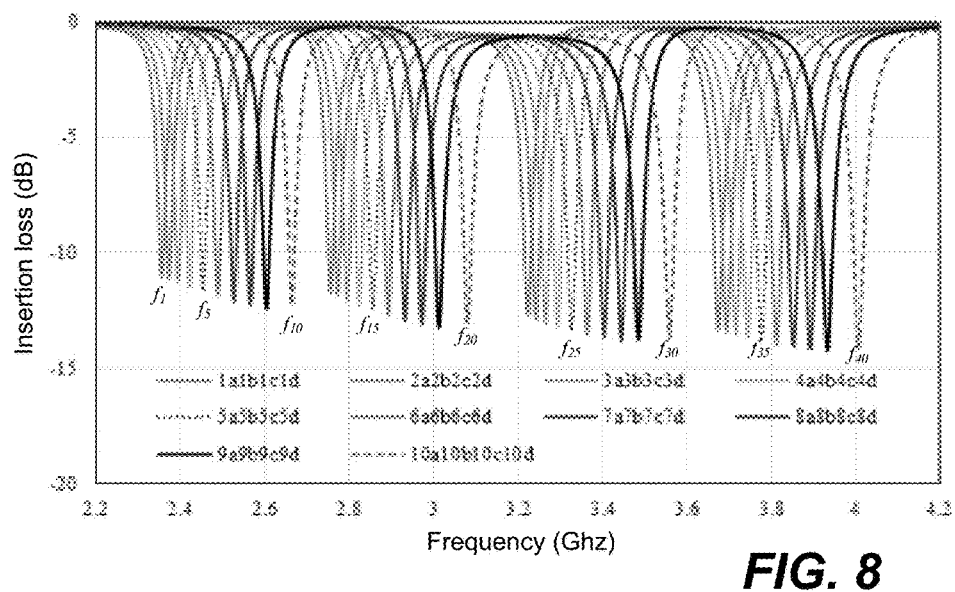
FIG. 8 is a composite plot of the simulated "$S_{21}$" scatter parameter (insertion loss) response patterns for the resonator circuit of FIG. 6, the ten traces resulting from connecting adjusting or shorting element $E_1$ to the spiral frame in each of all four resonators, then connecting adjusting or shorting element $E_2$ to the spiral frame in each of all four resonators, etc. through adjusting or shorting element $E_9$, and then with no adjusting or shorting element connected to the spiral frame in any of the four resonators.

The resonator circuit of FIG. 6 was simulated for embodiments where each of the four resonators had the same corresponding adjusting or shorting element $E_1$ through $E_9$ connected to its U-shaped spiral resonator frame. FIG. 7 shows the simulated return loss ($S_{11}$) response patterns when the resonators are connected in this manner. FIG. 8 shows the corresponding insertion loss ($S_{21}$) response patterns when the resonators are connected in this manner. Four frequency bands will be read simultaneously using the RFID reader.

In order to further validate the reconfigurable resonators for chipless RFID applications, an embodiment of the resonator circuit of FIG. 6 was built with an arbitrary state selected called ($f_2 f_{15} f_{27} f_{39}$). In this example, the second arm (E2) of the first resonator (#A), the fifth arm (E5) of the second resonator (#B), the seventh arm (E7) of the third resonator(#C), and the ninth arm (E9) of the fourth resonator (#D) are connected to be in the active mode. The corresponding resonance frequencies of the first, second, third, and fourth resonators are: $f_2$, $f_{15}$, $f_{27}$, $f_{39}$, respectively, the frequencies being identified in Table 3 as $f_2$=2.371, $f_{15}$=2.855, $f_{27}$=3.404, and $f_{39}$=3.934 GHz.

The size of the circuit is 5.52×2.83×0.08 cm$^3$ (length× width×height). The scattering or s-parameter responses were simulated by electromagnetic simulator and also measured. In order to measure the s-parameter responses, coaxial cable connectors (ports) were connected to opposite ends of the transmission line (Feeder) of the resonator circuit of FIG. 6 in order to connect the device to a vector network analyzer, similar to the experimental testing configuration shown in FIG. 2(*b*) of International Patent Application Number WO 2009/126999, the contents of which are hereby incorporated by reference in their entirety. The two-port S-parameters measurements are carried out by Anritsu microwave Vector Network Analyzer (VNA 37369C).

Figure 9A:
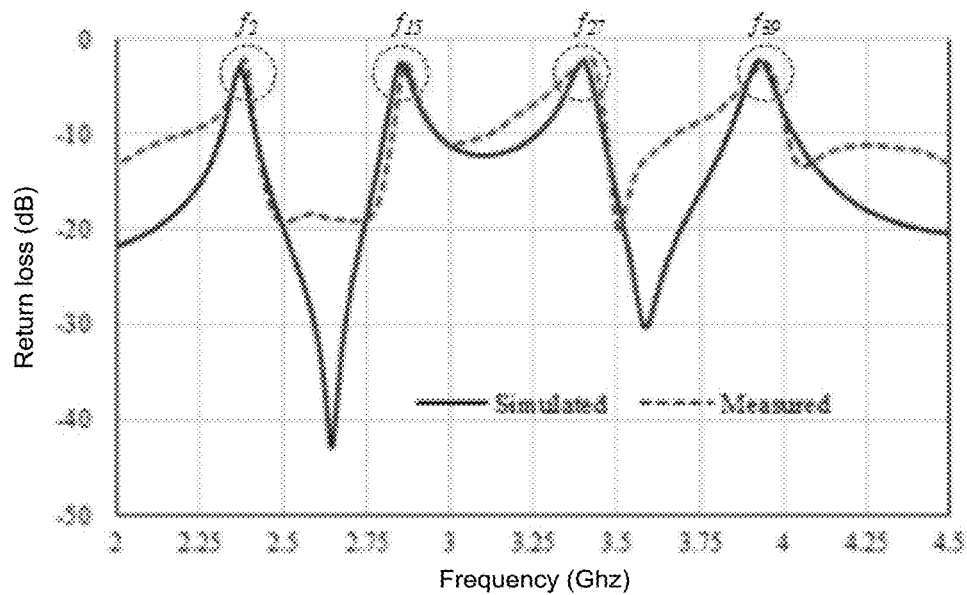
FIG. 9A is a plot comparing the simulated "$S_{11}$" scatter parameter (return loss) response pattern for the resonator circuit of FIG. 6 with the "$S_{11}$" scatter parameter (return loss) response pattern measured by a vector network analyzer where adjusting or shorting element $E_2$ is connected to the spiral frame in resonator A, adjusting or shorting element $E_5$ is connected to the spiral frame in resonator B, adjusting or shorting element $E_7$ is connected to the spiral frame in resonator C, and adjusting or shorting element $E_9$ is connected to the spiral frame in resonator D.
Figure 9B:
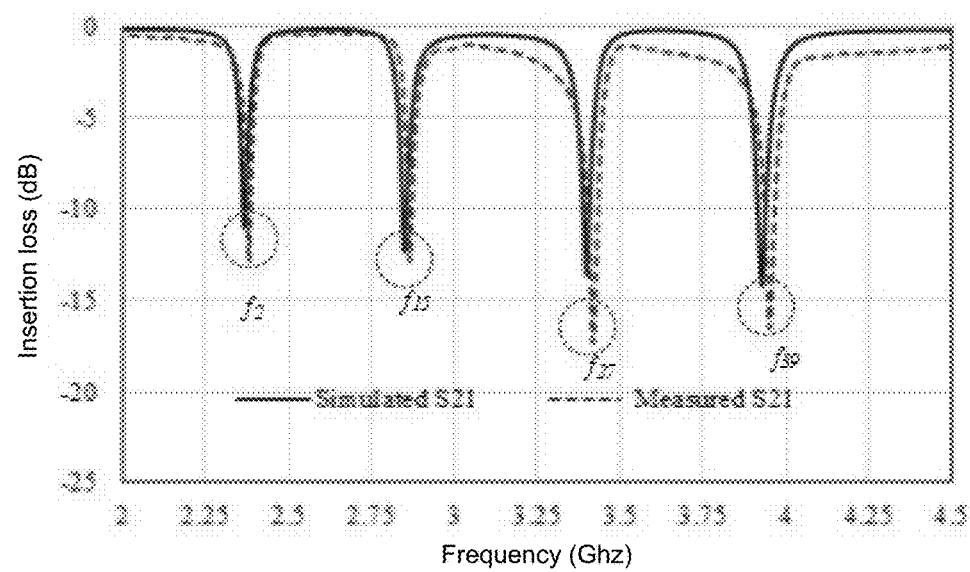
FIG. 9B is a plot comparing the simulated "$S_{21}$" scatter parameter (insertion loss) response pattern for the resonator circuit of FIG. 6 with the "$S_{21}$" scatter parameter (return loss) response pattern measured by a vector network analyzer where adjusting or shorting element $E_2$ is connected to the spiral frame in resonator A, adjusting or shorting element $E_5$ is connected to the spiral frame in resonator B, adjusting or shorting element $E_7$ is connected to the spiral frame in resonator C, and adjusting or shorting element $E_9$ is connected to the spiral frame in resonator D.

The simulated and measured insertion loss ($S_{21}$) of the selected four-resonator configuration are plotted and compared in FIG. 9B. The simulated and measured return loss ($S_{11}$) of the selected four-resonator configuration are plotted and compared in FIG. 9A. The measured results are in good agreement with the simulated results.

In use, the reconfigurable resonators for chipless RFID applications may be used to represent RFID codes as follows. Each resonator can be configured to represent one of K states. Where the RFID code is a binary number, and where K=10, e.g., as in the above examples, each state can represent a binary number up to four digits in length. Thus, Table 2 could be extended as shown in FIG. 4. When it is desired to use a resonator to encode the binary RFID code 0100, for example, element $E_5$ of the resonator is connected to the frame as shown in FIG. 3E. The resulting response from the resonator to the RFID reader would show an "$S_{11}$" scatter parameter (return loss) curve similar to the dotted line curve of FIG. 4 with a peak magnitude at 2.452 GHz and an "$S_{21}$" scatter parameter (insertion loss) similar to the dotted line curve of FIG. 5 with a null at 2.452 GHz. Four such resonators, each having nine shorting or adjusting elements (K−1=9), could be used in an RFID tag to represent sixteen binary RFID code digits using only four resonant frequencies, whereas a conventional spiral resonator for a chipless RFID tag would require sixteen resonators using sixteen resonant frequencies to encode the same sixteen binary digits.

TABLE 4

Exemplary RFID coding for resonator with K = 10 states

| State | Element connected to frame | Identifier | Frequency (GHz) | RFID Code |
|---|---|---|---|---|
| 1 | $E_1$ | $f_1$ | 2.356 | 0000 |
| 2 | $E_2$ | $f_2$ | 2.371 | 0001 |
| 3 | $E_3$ | $f_3$ | 2.393 | 0010 |
| 4 | $E_4$ | $f_4$ | 2.421 | 0011 |
| 5 | $E_5$ | $f_5$ | 2.452 | 0100 |
| 6 | $E_6$ | $f_6$ | 2.489 | 0101 |
| 7 | $E_7$ | $f_7$ | 2.526 | 0110 |
| 8 | $E_8$ | $f_8$ | 2.563 | 0111 |
| 9 | $E_9$ | $f_9$ | 2.604 | 1000 |
| 10 | None | $f_{10}$ | 2.663 | 1001 |
| 11 | These RFID Codes are unused | | | 1010 |
| 12 | | | | 1011 |
| 13 | | | | 1100 |
| 14 | | | | 1101 |
| 15 | | | | 1110 |
| 16 | | | | 1111 |

It is to be understood that the reconfigurable resonators for chipless RFID applications is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. Reconfigurable resonators for chipless RFID applications, comprising a resonator circuit having:
    a substrate;
    a plurality of microstrip resonators disposed on the substrate, each of the resonators including:
        a U-shaped spiral resonator frame having opposed parallel legs; and
        a plurality of parallel shorting elements extending between and spaced apart from the opposed parallel legs of the frame; and
    a transmission line extending parallel to one of the opposed parallel legs of the frame of each of the resonators, the transmission line being spaced from the frame leg a distance permitting coupling of microwave signals between the transmission line and each of the resonators, the transmission line having opposing ends, each of the ends being adapted for connection to a corresponding antenna for reception and transmission of an interrogation signal to and from an RFID reader in order to form a chipless passive RFID tag;
    wherein each of the resonators is configured to resonate in a separate and distinct frequency range from the other resonators forming a stopband filter having a resonant frequency within the separate and distinct frequency range; and
    wherein each of the resonators is adapted for reconfiguration of the stopband filter's resonant frequency by operation without a jumper or by installation of a conductive jumper between one of the shorting elements and the leg of the U-shaped resonator frame opposite the leg coupled to the transmission line.

2. The reconfigurable resonators according to claim 1, wherein the substrate comprises a dielectric material and said resonators and said transmission line comprise conductive metal strips disposed on the dielectric material.

3. The reconfigurable resonators according to claim 2, wherein said dielectric material comprises a printed circuit board.

4. The reconfigurable resonators according to claim 1, wherein each said resonator encodes multiple bits of an RFID code.

5. The reconfigurable resonators according to claim 1, wherein each said resonator is capable of encoding multiple bits of an RFID code using a single frequency selected from a number of possible frequencies equal to the number of shorting elements plus one.

6. The reconfigurable resonators according to claim 1, wherein said resonator circuit is capable of encoding an RFID code using a number of possible frequencies equal to the number of resonators multiplied by the number of shorting elements per resonator plus one.

7. The reconfigurable resonators according to claim 1, wherein the substrate comprises a nonconductive material and said resonators and said transmission line comprise conductive ink printed on the nonconductive material.

8. The reconfigurable resonators according to claim 1, wherein at least one of said resonators further comprises a conductive jumper connecting one of said shorting elements to the leg of the U-shaped resonator frame opposite the leg coupled to the transmission line.

9. The reconfigurable resonators according to claim 1, wherein said conductive jumper comprises a metal strip.

10. The reconfigurable resonators according to claim 1, wherein said conductive jumper comprises conductive ink.

11. A passive RFID transponder tag, comprising the reconfigurable resonators according to claim 1 and at least one antenna connected to the opposite ends of the transmission line.

* * * * *